3,150,924
PRETREATMENT OF URANIUM DIOXIDE TO PROMOTE ITS CONVERSION TO URANIUM TETRAFLUORIDE
Seymour H. Smiley and Donald C. Brater, Oak Ridge, and Charles C. Littlefield, Kingston, Tenn., assignors to the United States of America as represented by the United States Atomic Energy Commission
Filed Mar. 8, 1962, Ser. No. 183,689
6 Claims. (Cl. 23—14.5)

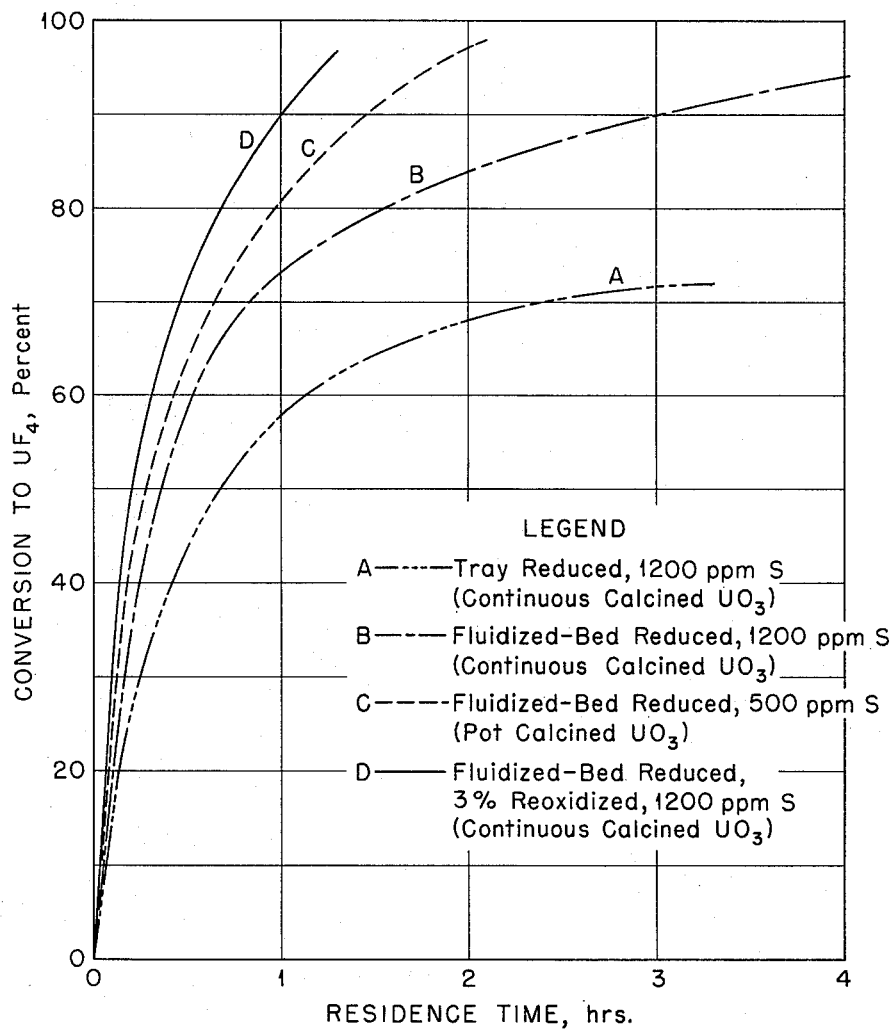

This application is a continuation-in-part of our application Serial No. 790,030, filed January 29, 1959, now abandoned.

Our invention relates to a process for the conversion of an aqueous uranyl nitrate solution to uranium hexafluoride and more particularly to a method for improving the intermediate step in said process wherein uranium dioxide is reacted with hydrogen fluoride to produce uranium tetrafluoride.

Uranium hexafluoride, the process gas for uranium isotope separation by means of gaseous diffusion, is currently produced on a large scale from source materials in the form of uranium ore concentrates and irradiated uranium metal. These materials are purified by dissolution in nitric acid and selective extraction of the uranium with an organic solvent. The uranium is then re-extracted to produce an aqueous uranyl nitrate solution.

Conversion of the uranyl nitrate solution to uranium hexafluoride is effected by a series of high-temperature chemical reactions. The nitrate solution is heated to evaporate the water and form molten hydrated uranyl nitrate which decomposes to $UO_3$ upon being calcined. The $UO_3$ is reduced with hydrogen to produce $UO_2$, and the $UO_2$ is reacted with hydrogen fluoride to form $UF_4$. The $UF_4$ is then reacted with fluorine to produce $UF_6$.

Substantial problems have been encountered in this processing sequence, and in particular in the reaction of $UO_2$ with gaseous HF to produce $UF_4$. This reaction is strongly exothermic, and the solids involved exhibit relatively poor heat-transfer characteristics. The product $UF_4$, as well as partially converted $UO_2$, sinters at temperatures only slightly above the required reaction temperature. As a consequence sintering and bed caking have frequently occurred in the reaction mass, and prolonged HF contact time has been required for conversion to $UF_4$. Production rates in this step decrease with the increased HF contact time. Unreacted $UO_2$ in the product $UF_4$ may be converted to $UF_6$ along with the $UF_4$ in the subsequent reaction with fluorine. The presence of unreacted $UO_2$ is highly undesirable, however, since this material requires three times as much fluorine as $UF_4$ for conversion to $UF_6$ and releases five times as much heat. Thus, not only is a larger amount of expensive fluorine required, but the permissible fluorination reaction throughput must be decreased for incompletely converted material to avoid exceeding the temperature limitations of the apparatus employed.

The reaction of $UO_2$ with HF is greatly influenced by the processing history of the $UO_2$, and in particular by the conditions employed in the preceding calcination and reduction steps. The reduction temperature affects the reactivity of the product $UO_2$ in that the $UO_2$ reactivity decreases drastically with increasing reduction temperatures over about 1200° F. The reduction reaction is also a strongly exothermic, high-temperature reaction so that close control of temperature is required in order to avoid low reactivity in the $UO_2$. The problems associated with the reduction reaction have been largely alleviated by the improved temperature control obtained through the use of fluidized-bed reactors. By this means $UO_3$ is reduced to $UO_2$ at high production rates and the bed temperature is maintained at a uniform level sufficiently low, that is, about 1000° F. to 1150° F., to obtain maximum reactivity toward HF of the resulting $UO_2$.

The reactivity of $UO_2$ toward HF varies substantially with the reaction conditions employed in calcination of the parent $UO_3$. Calcination is carried out on a large scale by two types of methods, batch or pot calcination and continuous calcination. In the former method molten hydrated uranyl nitrate is heated in an agitated stainless steel pot until substantially nitrate-free $UO_3$ is obtained. In one embodiment, the pot is maintained at a shell temperature of about 930° F., and the oxide temperature is about 570° F. This method is currently carried out in pots having a 55-gallon charge capacity and a 275-gallon charge capacity. The $UO_3$ produced by this method is relatively fine, even before grinding, much of this material passing a 325-mesh screen. The bulk density of this material is normally about 2.5 grams per cubic centimeter and the surface area about 2 square meters per gram. $UO_2$ obtained from this material in general exhibits favorable reactivity toward HF. In the continuous calcination type method, molten hydrated uranyl nitrate is continuously introduced into an agitated bed of $UO_3$ and the product $UO_3$ is continuously removed. One continuous calciner embodiment utilizes a trough having a non-conveying paddle-type agitator. Molten uranyl nitrate is fed to the $UO_3$ bed in the trough from three feed pipes extending from the top of the trough. Product $UO_3$ overflows through a weir at one end of the trough. The trough wall temperature is maintained at about 975° F. and the $UO_3$ temperature is about 570° F. $UO_3$ produced by this method is in the form of layered spherical particles averaging about 150 microns in diameter. This material has a high bulk density, i.e., approximately 4.5 grams per cubic centimeter, and is free-flowing. Although continuous calcination is advantageous over pot calcination in several respects such as lower operating costs and decreased dust hazards, the $UO_2$ obtained from this material has a lower reactivity toward HF than batch-calcined material. Even when the continuous-calcined material is ground to produce fine particles with a high surface area, e.g., about 4 square meters per gram, the $UO_2$ reactivity under practical plant-operating conditions is lower than for batch-calcined material having a lower surface area.

Various measures have been employed previously for improving the reactivity of $UO_2$ toward HF. As mentioned above, the use of fluidized-bed reactors in the reduction step has alleviated the adverse effects of excessive reduction temperatures. The addition of sulfur in the form of sulfate ion to the starting uranyl nitrate at a level of 500 to 3000 parts per million parts uranium solution has also improved the reactivity of $UO_2$. Controlled hydration and dehydration of the parent $UO_3$ has also been employed, but this measure has certain disadvantages for large-scale production. Improved conversion of $UO_3$ to $UF_4$ has also been obtained through the use of fluidized-bed reactors for hydrofluorination, whereby more uniform temperatures are maintained.

Despite the use of such measures, however, the reactivity of continuous-calcined material has remained undesirably low. An HF contact time up to 3 to 5 times as long as for batch-calcined material has been required to attain a given level of conversion to $UF_4$. The reactivity of batch-calcined material is also undesirably low where hydrofluorination is carried out at high throughputs and the tendency of the solids to sinter is increased.

It is, therefore, an object of our invention to provide a method of improving the conversion of a uranyl nitrate solution to $UF_6$.

Another object is to improve the reaction in the conversion of a uranyl nitrate solution to $UF_6$ wherein $UO_2$ is contacted with HF.

Another object is to decrease the HF contact time required for the conversion of $UO_2$ to $UF_4$.

Another object is to improve the reactivity toward HF of $UO_2$ obtained by hydrogen reduction of $UO_3$ produced by continuous calcination of hydrated uranyl nitrate.

Another object is to decrease the amount of fluorine required for the conversion of continuous-calcined $UO_3$ to $UF_6$.

Other objects and advantages of our invention will be apparent from the following detailed description and claims appended hereto.

In accordance with our invention conversion of a uranyl nitrate solution to $UF_6$ by means of the process which comprises heating said solution to form hydrated uranyl nitrate, calcining the resulting hydrated uranyl nitrate to form $UO_3$, reducing the $UO_3$ to $UO_2$ with hydrogen in an oxygen-free system, reacting the resulting $UO_2$ with HF in an oxygen-free system to form $UF_4$ and reacting the $UF_4$ with fluorine is improved by reoxidizing the $UO_2$ to the extent of an increase in hexavalent uranium content of at least one percent prior to reacting the $UO_2$ with HF. The reactivity of the $UO_2$ toward HF is substantially increased by this means, particularly where the parent $UO_3$ is prepared by continuous calcination. For this material a threefold decrease in the HF contact time required for conversion to $UF_4$ is obtained.

We have found that the reactivity of $UO_2$ toward HF is unexpectedly enhanced by means of a controlled reoxidation step. It was known previously that extremely fine $UO_2$ powder is generally more reactive than coarse material and will reoxidize to a greater extent if the powder is allowed to come into contact with air. This fact, however, in no way made reoxidation inherent or unavoidable in the reduction-hydrofluorination process wherein the method of our invention is employed. In this process, before our improvement, the reduction and hydrofluorination steps were carried out in an oxygen-free system, and the $UO_2$ was conveyed from the reduction reactor to the hydrofluorination reactor without coming into contact with air. Oxidation had been purposely avoided since the hexavalent uranium contained in the $UO_2$ is converted to $UO_2F_2$ upon reaction with HF, and $UO_2F_2$ requires twice as much fluorine as $UF_4$ for conversion to $UF_6$.

Although our invention is not to be understood as limited in any way thereby, two theoretical explanations are offered for the unexpected improved $UF_4$ conversion obtained through reoxidation. One explanation is that a thin, high-melting layer of uranyl fluoride is formed on the surface of the $UO_2$ particles upon exposure of the reoxidized $UO_2$ to HF and that the high-melting $UO_2F_2$ layer serves to retard the initial reaction rate and decrease the amount of heat liberated. The other explanation is that the additional oxygen produces a strain in the $UO_2$ crystal lattice, resulting in foliation, thus opening gas paths in the crystal structure.

Reoxidation of the $UO_2$ to the extent of at least a one mole percent increase in hexavalent uranium content with respect to total uranium is required for a substantial improvement in reactivity, and reoxidation to at least two percent is preferred. The hexavalent uranium content thus obtained is in addition to the small amount, e.g., 1 mole percent, which is normally present as a result of incomplete reduction of $UO_3$ in large-scale equipment. The upper limit of the extent of reoxidation is determined by overall economic considerations. $UO_2F_2$ is formed upon contact of the hexavalent uranium with HF, and this compound requires twice as much fluoride as $UF_4$ for conversion to $UF_6$. The increase in $UF_4$ production rates obtained by reoxidation is considered in comparison to the cost of the additional fluorine. At present costs the advantage of reoxidation is nullified at a level of about 8 mole percent, and maximum overall advantage is obtained at a level of 2 to 7 mole percent.

The $UO_2$ is reoxidized by intimately contacting it with an oxygen-bearing gas stream under controlled conditions of time and temperature. In order to obtain a rapid reaction and to control the extent of reoxidation, it is preferred to reoxidize the $UO_2$ directly upon removal from the reduction reactor where the $UO_2$ is produced and while the $UO_2$ is at a relatively high temperature of about 400° F. to 600° F. At this temperature a contact time of about 5 to 10 minutes is sufficient to provide the desired extent of reoxidation. Lower temperatures down to room temperature may be employed, in which case the contact time is increased. Intimate contact of the $UO_2$ with the oxygen-bearing stream is required to obtain uniform and controlled reoxidation. Suitable contact may be obtained through the use of conventional gas-solid reactors, and preferably fluidized-bed reactors. Although the composition of the oxygen-bearing stream is not critical, it is preferred to employ less than 4 percent oxygen in an inert gas such as nitrogen in order to avoid an explosive reaction with hte hydrogen present in close proximity in the reduction system. Under the preferred conditions, oxygen reacts readily with the $UO_2$, and only an approximately stoichiometric amount is required. Large quantities of material may be processed rapidly under these conditions, e.g., about 1500 pounds of $UO_2$ per hour in a fluidized-bed reactor 8 inches in diameter with a bed depth of 3 feet. It is to be understood that merely allowing the $UO_2$ in bulk form to come into contact with atmospheric oxygen is unsuitable. The $UO_2$ is not reoxidized uniformly or in a predictable manner by this means. In addition, the $UO_2$ frequently contains a high proportion of relatively large particles which are not susceptible to atmospheric oxidation at room temperature except after prolonged contact times which are impractical and uneconomical for large-scale operation.

The method of our invention is applicable to improving the reactivity of $UO_2$ produced from a uranyl nitrate solution by calcination. Although this method is primarily applicable to continuous-calcined material, some improvement is also obtained for batch-calcined material. The extent of improvement varies with the particular calcination conditions employed and with the conditions employed in hydrofluorination. For example, substantial improvement of the conversion of batch-calcined material to $UF_4$ is obtained only at higher material throughputs in the hydrofluorination step than for continuous-calcined material. As used in this specification and the claims appended hereto the term, "continuous calcination of $UO_3$" or equivalent expression is intended to refer to the calcination process wherein molten uranyl nitrate or a concentrated uranyl nitrate solution is continuously introduced into an agitated bed of $UO_3$ at a bed temperature of about 450° to 700° F. and the product $UO_3$ is continuously removed from the bed. The product $UO_3$ is in the form of layered, spherical particles from about 325 mesh to 16 mesh, U.S. Sieve Series, in size. Continuous calcination in this manner is primarily carried out in agitated trough-type reactors. Further details regarding this type reactor may be seen by reference to the report, "Symposium on the Reprocessing of Irradiated Fuels, Held at Brussels, Belgium, May 20–25, 1957," TID-7534, Book I, pages 286–295. Continuous calcination is also carried out in fluidized-bed reactors wherein a bed of $UO_3$ is continuously agitated and fluidized by a stream of heated air and a concentrated molten uranyl nitrate solution is continuously sprayed into the bed. The temperature is maintained at the same level as for the trough-type reactor. The product $UO_3$ is continuously removed from the bottom of the bed. This material has substantially the same properties and exhibits the same behavior upon conversion to $UO_2$ as $UO_3$ calcined in the trough-type reactor.

Our invention is also applicable to a process wherein the starting $UO_3$ is produced by batch calcination in pot-type reactors. In this type reactor the same calcination temperature is employed as for continuous calcination, but, as pointed out above, the oxide properties differ widely from continuous-calcined material, and less improvement is obtained by reoxidation.

Reoxidation of $UO_2$ may be employed together with previously known methods for improving the reactivity. For example, the $UO_3$ may be comminuted by grinding or pulverizing to produce smaller, more reactive particles. The $UO_3$ may also contain sulfur added as sulfate ion prior to calcination at a level of about 500 to 3000 parts per million parts uranium. The use of these measures in combination with reoxidation is preferred for continuous calcined material.

With regard to the reduction step, our invention is primarily applicable to $UO_2$ produced by reduction of the above-described $UO_3$ at a temperature not exceeding about 1300° F. Reoxidation may also be employed to improve the reactivity of $UO_2$ produced at higher temperatures, but such temperatures are normally avoided in large-scale processing because of their adverse effect on $UO_2$ reactivity. The use of an oxygen-free system is required, but the other conditions employed in the reduction step are not critical. It is preferred, however, to conduct the reaction in a fluidized-bed reactor at a bed temperature of about 1000° F. to 1150° F. Other reactors such as conventional vibrating-tray and screw types may also be employed.

The reoxidized $UO_2$ is contacted with HF under the conditions previously employed for non-reoxidized $UO_2$. This reaction is effected by contacting $UO_2$ with HF in an oxygen-free system at a temperature of 550° F. to 1000° F. Conventional reactors such as stirred-bed and vibrating-tray types may be employed, but the use of a fluidized-bed reactor is also preferred for this step. The $UO_2$ is contacted with HF until the desired level of conversion to $UF_4$, e.g., 95 percent is obtained. The hexavalent uranium contained in the reoxidized $UO_2$ is converted to $UO_2F_2$ in this step so that complete conversion to $UF_4$ is not obtained.

The resulting $UO_2F_2$-containing $UF_4$ is converted to $UF_6$ by reacting it with fluorine by previously known methods. The presence of the relatively small amount of $UO_2F_2$ does not significantly affect the operation of $UF_4$ fluorination reactors. Although not critical, it is preferred to fluorinate the $UO_2F_2$-containing $UF_4$ mixture in a vertical tower reactor wherein these materials are intimately mixed at the top of the tower and passed downward through a reaction zone at a temperature of about 850° F. to 1000° F. This reaction may also be carried out in a fluidized-bed reactor. The resulting $UF_6$ is recovered by conventional cold-trapping.

Reoxidation of the $UO_2$ by the method of our invention results in the presence of $UO_2F_2$ in the $UF_4$, and more fluorine is required for conversion of this material to $UF_4$ than is required for $UF_4$ alone. Despite this fact, a substantial overall economic advantage is obtained by reoxidation. Where unreactive $UO_2$ is not reoxidized, however, the HF contact time is prolonged so that production rates are decreased and greater capital costs are encountered in providing additional hydrofluorination reactors. In addition, $UF_4$ prepared without reoxidation may contain substantial amounts of unreacted $UO_2$, which requires even more fluorine than $UO_2F_2$ and presents difficulty in the fluorination reaction.

Our invention is further illustrated by the following specific examples.

EXAMPLE I

Four pilot plant reduction and hydrofluorination runs were conducted to compare the effects of the method of $UO_3$ calcination, the reduction method and reoxidation on the contact time required to attain a given level of conversion to $UF_4$. In three runs reduction was conducted in a six-inch diameter, two-stage fluidized-bed reactor, and in the fourth reduction was carired out in a vibrating-tray reactor eleven feet long by six inches wide. Hydrofluorination in each run was conducted in a vibrating-tray reactor fifteen feet long by six inches wide. The reduction temperature was maintained at approximately 1000° F. in each run, and the hydrofluorination temperature was graded along the length of the reactor from 550° F. to 850° F. The starting $UO_3$ in three runs had been prepared by calcination of uranyl nitrate hexahydrate in a vigorously agitated, trough-type continuous calciner at a temperature of about 570° F. In the fourth run the $UO_3$ had been prepared by calcination of uranyl nitrate hexahydrate in a pot-type vessel at a temperature of about 480° F. Continuous-calcined, fluidized-bed reduced $UO_2$ was reoxidized to the extent of an increase in hexavalent uranium content of three percent in one run by introducing the $UO_2$ into a four-inch diameter fluidized-bed reactor and contacting the $UO_2$ with a nitrogen stream containing approximately two to four percent oxygen. In the reduction runs $UO_3$ was fed into the reactor at a rate of approximately sixty pounds per hour. In the hydrofluorination runs the powder bed depth was adjusted to a level approximately equal to the bed depth encountered in a plant-scale reactor with a bed two feet wide by eighty feet long at a feed rate of five tons of uranium per line day, this procedure being employed to correlate the results directly to plant-scale equipment. The $UO_2$ powder bed was contracted with HF for various periods of time, and the percent conversion to $UF_4$ was determined. The results obtained may be seen by reference to the accompanying figure, in which the percent conversion to $UF_4$ is plotted against the hydrofluorination residence time for each run. The improvement effected by reoxidation may be seen by comparing runs B and D. In each of these runs the $UO_3$ calcination and reduction steps were conducted under the same conditions, and the $UO_3$ contained 1200 parts per million sulfate in each case. In run B three hours' residence time was required to reach a $UF_4$ level of 90 percent, while the three percent reoxidized $UO_2$ in run D required only one hour to reach this level. This shortened residence time brings about a tripled production rate for the particular material involved. Run A shows the relatively low conversion obtained for tray-reduced $UO_2$ as compared with the fluidized-bed reduced, and run C shows the high conversion obtained for pot-calcined material.

EXAMPLE II

A series of pilot plant runs was conducted to determine the effect of reoxidation as compared to incomplete reduction. The system employed for these runs consisted of the fluidized-bed reduction reactor, fluidized-bed reoxidation reactor and vibrating-tray hydrofluorination reactor described in Example I. Reduction was conducted at a temperature of approximately 1000° F. with an average powder residence time of one hour. In the runs in which the $UO_2$ was reoxidized, the powder output from the reduction reactor was fed directly into the reoxidation reactor at a rate of sixty pounds per hour. The fluidizing gas consisted of about one percent oxygen in nitrogen. The reoxidation temperature was approximately 600° F., and the average residence time was eleven minutes. Hydrofluorination was conducted at temperatures from 650° F. to 950° F., graded down the length of the tray, in each run. The hydrofluorination bed depth in each run was maintained at a constant value equivalent to the bed depth encountered in plant-scale reactor bed two feet wide by eighty feet long at a feed rate of slightly less than five tons of uranium per line day.

The starting $UO_3$ in each of these runs was prepared by continuous calcination of hydrated uranyl nitrate in an agitated, trough-type reactor at a bed temperature of about 570° F. Sulfate ion was provided in the uranyl nitrate at a level of 1200 parts per million.

Further details and results of these hydrofluorination runs may be seen by reference to the following table.

*Table I*

PILOT PLANT HYDROFLUORINATION OF SLIGHTLY REOXIDIZED $UO_2$

| Run No. | $UO_2$ Feed Rate, Equivalent* Tons of U per Line Day | Residence Time, Hours | Initial Reduction to $UO_2$, Percent | $UO_2$ Reoxidation, Percent | Final $UO_2$ Content, Percent | Conversion to $UF_4$, Percent |
|---|---|---|---|---|---|---|
| 1 | 4.9 | 1.1 | 98 | 3.7 | 94.3 | 89.8 |
| 2 | 4.5 | 1.2 | 98 | 2.1 | 95.9 | 88.4 |
| 3 | 4.8 | 1.2 | 98 | 3.5 | 94.5 | 89.0 |
| 4 | 4.9 | 1.1 | 94.5 | None | 94.5 | 72.8 |
| 5 | 4.7 | 1.3 | 98.8 | None | 98.8 | 79.0 |

*Feed rate of a plant-scale reactor two feet long by eighty feet wide at the same bed depth as employed in these pilot plant runs.

It may readily be seen that reoxidation of the $UO_2$ resulted in a substantial gain in $UF_4$ conversion, but that no gain was effected by employing incomplete reduction to reach the same hexavalent uranium content as obtained by reoxidation. In runs 1–3, $UO_2$ reoxidized 2.1 to 3.7 percent showed $UF_4$ conversions of 88.4 to 89.8 percent, while $UF_4$ conversion for non-reoxidized $UO_2$ in run 5 was only 79.0 percent. Incompletely reduced $UO_2$ in run 4 showed even less conversion than run 5, and 16 percent less than $UO_2$ with the same hexavalent uranium content obtained by reoxidation in run 3.

EXAMPLE III

A series of $UF_4$ production runs was conducted in a plant-scale system consisting of a two-stage fluidized-bed reduction reactor, a fluidized-bed reoxidation reactor, and a conventional screw-type hydrofluorination reactor. The starting $UO_3$ in each run was prepared by continuous calcination of uranyl nitrate hexahydrate in a vigorously agitated, trough-type reactor at a bed temperature of about 570° F. Sulfate ion was provided in the starting material at varying levels. The reoxidation reactor had a diameter of eight inches and was connected directly to the powder outlet of the reduction reactor. The reoxidation temperature was approximately 400° F., and reoxidation was effected by introducing a fluidizing stream of a small proportion (e.g., four percent) of oxygen in nitrogen at an average $UO_2$ residence time of ten minutes. The extent of reoxidation was varied by employing different proportions of oxygen in each run. The reoxidized $UO_2$ overflowed continuously into the hydrofluorinator.

Further details and the results obtained in the hydrofluorination runs may be seen by reference to Table II.

*Table II*

PLANT-SCALE HYDROFLUORINATION OF PARTIALLY REOXIDIZED $UO_2$

| Run No. | Feed Rate, Ton U/Day | Temperature, ° F., graded down the reactor | HF Excess, Percent | Length of Run, Hours* | Sulfate Content, p.p.m. | $UO_2$ Reoxidized, Percent | Product | | | |
|---|---|---|---|---|---|---|---|---|---|---|
| | | | | | | | $UF_4$ | $UO_2F_2$ | $UO_2$ | Percent $UF_4+\frac{1}{2}\%$ $UO_2F_2$ |
| 1 | 6.9 | 618–950 | 98.0 | 35 | 1,200 | none | 82 | 2 | 16 | 83.0 |
| 2 | 6.5 | 580–985 | 90–118 | 63 | 1,200 | 3 | 89 | 5 | 6 | 91.5 |
| 3 | 7.2 | 580–1000 | 96 | 68 | 1,200 | 6 | 88 | 8 | 4 | 92.0 |
| 4 | 6.8 | 550–1000 | 91.4 | 56 | 1,000 | 6 | 83 | 8 | 9 | 87.0 |
| 5 | 7.5 | 500–1000 | 14.3 | 60 | 1,600 | 7 | 85 | 9 | 6 | 89.5 |
| 6 | 8.8 | 550–1000 | 10.5 | 85 | 2,000 | 5 | 86 | 7 | 7 | 89.5 |

*Average powder residence time was about five hours.

In Table II the results are expressed in terms of percent $UF_4$ plus one-half of the $UO_2F_2$ percent. This value is inversely proportional to the amount of fluorine required to convert the product to $UF_6$ since the $UO_2F_2$ requires twice as much fluorine as $UF_4$. It may be readily seen that this value was increased in every case where the $UO_2$ was reoxidized (runs 2–6) over the value obtained for non-reoxidized $UO_2$ (run 1). This extent of improvement has also been obtained in plant operation at feed rates approximately two times as high as the rates shown in Table II.

The above examples are merely illustrative and are not to be understood as limiting the scope of our invention, which is limited only as indicated in the appended claims.

Having thus described our invention, we claim:

1. In the method for conversion of an aqueous uranyl nitrate solution to $UF_6$ which comprises heating said solution whereby hydrated uranyl nitrate is formed, continuously calcining said uranyl nitrate in an agitated bed of $UO_3$ at a bed temperature of about 450° F. to 700° F., whereby layered, generally spherical $UO_3$ particles having a particle size of about 325 mesh to 16 mesh, U.S. Sieve Series, are produced, continuously removing the resulting $UO_3$ from said bed, contacting said resulting $UO_3$ with gaseous hydrogen in an oxygen-free system at a temperature below 1300° F. until about 98 to 99 mole percent of the uranium therein is converted to the tetravalent state, contacting the resulting $UO_2$ with HF in an oxygen-free system whereby $UF_4$ is formed and reacting said $UF_4$ with fluorine whereby $UF_6$ is formed, the improvement which comprises intimately contacting said $UO_2$ with a dilute oxygen-bearing inert gas stream at a preselected temperature for a time sufficient to increase the hexavalent uranium content of said $UO_2$ by an increment of 1 to 8 mole percent of the total uranium prior to contacting said $UO_2$ with HF.

2. The method of claim 1 wherein said $UO_2$ is intimately contacted with said dilute oxygen-bearing inert gas stream until the hexavalent uranium content of said $UO_2$ is increased by an increment of about 2 to 7 mole percent of the total uranium.

3. The method of claim 2 wherein the concentration of oxygen in said inert gas stream is less than about 4 volume percent.

4. The method of claim 2 wherein said $UO_2$ is intimately contacted with said dilute oxygen-bearing inert gas stream at a temperature of about 400° F. to 600° F. for a period of 5 to 10 minutes.

5. The method of claim 2 wherein sulfate ion is provided in said uranyl nitrate solution at a concentration of about 500 to 3000 parts per million part uranium.

6. The method of claim 2 wherein said $UO_3$ is comminuted prior to reduction to $UO_2$.

References Cited in the file of this patent

UNITED STATES PATENTS 2,811,414    Murphree _____ Oct. 29, 1957

OTHER REFERENCES

Proceedings of the International Conference on the Peaceful Uses of Atomic Energy, vol. 8, pp. 156–161, August 8–20, 1955.

Bard et al.: LA 1952, pp. 9–39. October 1955, declassified August 15, 1957.

Bruce et al.: "Process Chemistry," pp. 19-35 (1956), McGaw-Hill Book Co., N.Y.C., TK 9350B7.

Levitz: "Chem. Engineering Progress," April 1957, vol. 53, No. 4, pp. 199–202.

Kuhlman et al.: "Ind. and Eng. Chemistry," vol. 50, No. 12, December 1958, pp. 1774–1776.

Reactor Fuel Processing, vol. 1, pp. 32, 33, February 1958, TK9001R43.